United States Patent
Thomas et al.

(10) Patent No.: US 8,230,468 B2
(45) Date of Patent: Jul. 24, 2012

(54) DYNAMICALLY CREATING TRICK FILES TO HIDE LATENCY IN STREAMING NETWORKS

(75) Inventors: Anil Thomas, Milpitas, CA (US); Glenn Connery, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 826 days.

(21) Appl. No.: 12/165,723

(22) Filed: Jul. 1, 2008

(65) Prior Publication Data

US 2010/0003008 A1 Jan. 7, 2010

(51) Int. Cl.
*H04N 7/173* (2011.01)

(52) U.S. Cl. .............. 725/90; 725/88; 725/93; 725/115

(58) Field of Classification Search .............. 725/88, 725/90, 91, 92; 386/344
See application file for complete search history.

(56) References Cited

U.S. PATENT DOCUMENTS

| | | | |
|---|---|---|---|
| 6,847,780 B2 | 1/2005 | Gunatilake | |
| 6,871,006 B1 | 3/2005 | Oguz et al. | |
| 7,058,721 B1 * | 6/2006 | Ellison et al. | 709/231 |
| 7,764,863 B1 * | 7/2010 | Strasman et al. | 386/343 |
| 2005/0190794 A1 * | 9/2005 | Krause et al. | 370/485 |
| 2006/0020982 A1 * | 1/2006 | Jerding et al. | 725/89 |
| 2008/0172441 A1 | 7/2008 | Speicher et al. | |
| 2010/0050218 A1 * | 2/2010 | Carlucci et al. | 725/95 |

* cited by examiner

*Primary Examiner* — Chris Parry

(74) *Attorney, Agent, or Firm* — Edell, Shapiro & Finnan, LLC

(57) ABSTRACT

A system and process are provided to reduce the latency associated with delivery of data for trick functions (e.g., fast-forward or rewind) in data distribution systems. In response to a request for a trick function associated with program data being streamed to a user terminal, first trick data frames for the trick function are retrieved from a first computing apparatus (e.g., a storage server) and in the meantime second trick data frames for the trick function are generated at a second computing apparatus (e.g., streaming server). Until the first trick data frames arrive from the first computing apparatus, the second computing device streams the second trick data frames to the user terminal. The second computing apparatus streams the first trick data frame to the user terminal as they arrive.

28 Claims, 6 Drawing Sheets

US 8,230,468 B2

DYNAMICALLY CREATING TRICK FILES TO HIDE LATENCY IN STREAMING NETWORKS

BACKGROUND

Video-on-demand (VOD) is an example of one data distribution application in which video programs (movies, etc.) are streamed to remote user sites and certain functions associated with the streaming process are centralized remote from the user sites. For example, one class of such functions are fast-forwarding and rewinding the program at different speeds. To accommodate such functions, VOD servers generally create what are called "trick files" that compress time from the normal speed (1×) presentation program data stream to visually represent the speed of the desired trick, e.g. 8× fast-forwarding. This is done so that when the user is requesting a trick function (fast-forwarding or rewinding), it requires no more bandwidth than the 1× data stream. For example, a 3.75 Mbps 1× data stream would create a 3.75 Mbps 8× trick data stream which would be ⅛th as long in duration. This avoids creating higher loads on the VOD infrastructure and also avoids requiring higher network bandwidth when serving such trick functions since trick speeds are often supported up to 100× or more.

However, when a user switches from watching the video program at normal speed to requesting a trick, for example 8× fast forward, there will be some latency while that segment of the trick is fetched from the VOD servers. In a distributed VOD architecture, there is a storage server that manages the original source content and distributes the content to remotely located streaming servers over a wide-area network. Therefore, when the storage server is called upon to generate data for a trick function, this latency can be significant. The latency delay can be significant enough that a user may perceive it as an unacceptable delay in processing their request. For example, the user presses the Fast-Forward button on his/her remote, and it takes several seconds before the trick function is presented. Thus, there is a need to improve the performance of trick functions in distributed data network.

DESCRIPTION OF EXAMPLE EMBODIMENTS

Overview

A system and process are provided to reduce the latency associated with delivery of data for trick functions (e.g., fast-forward or rewind) in data distribution systems. In response to a request for a trick function associated with program data being streamed to a user terminal, first trick data frames for the trick function are retrieved from a first computing apparatus (e.g., a storage server) and in the meantime second trick data frames for the trick function are generated at a second computing apparatus (e.g., streaming server). Until the first trick data frames arrive from the first computing apparatus, the second computing device streams the second trick data frames to the user terminal. The second computing apparatus streams the first trick data frame to the user terminal as they arrive. In so doing, a user at the user terminal experiences minimal delay in viewing a requested trick function since the second computing apparatus begins sending the trick data to the user terminal before the pre-built trick data arrives for streaming to the user terminal.

Figure 1:
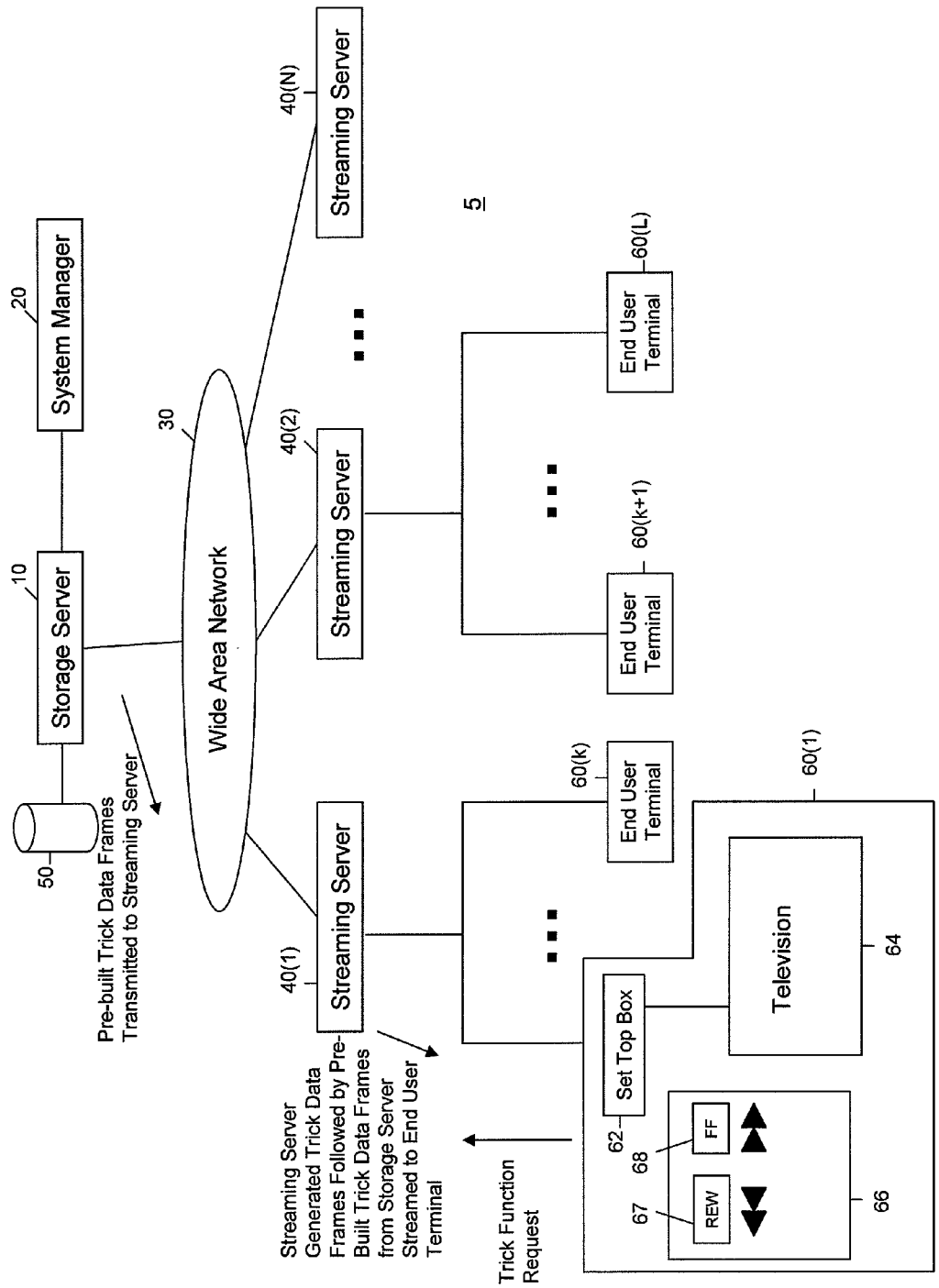
FIG. 1 is an example of a block diagram of a data distribution network that employs a reduced latency trick streaming process.

Referring first to FIG. 1, a data distribution network or system is generally shown at 5, and comprises a storage server 10 and a system manager 20 connected to the storage server that performs various system control and management functions. The storage server 10 is connected to a wide area network 30 in order to communicate with a plurality of streaming servers 40(1)-40(N). The storage server 10 retrieves data stored in a database 50 and streams the data to one or all of the streaming servers 40(1)-40(N). Examples of the types of data that the storage server 10 distributes include video programs (e.g., movies, television programs, and other video programming), video games, music, etc. The storage server 10 may be considered a first computing apparatus and any one of the streaming servers 40(1)-40(N) may be considered a second computing apparatus.

Each streaming server 40(1)-40(N) is assigned to stream data to one or more user terminals in a group of user terminals. For example, streaming server 40(1) is responsible for streaming data to user terminals 60(1)-60(K), streaming server 40(2) is responsible for streaming data to user terminals 60(K+1)-60(L), and so on. The type of communication medium employed between a streaming server and its associated user terminals may vary, examples of which include (but are not limited to) cable, optical, wireless or any combination thereof.

One application of the data distribution network 5 is the delivery of video-on-demand (VOD) content to users at user terminals. VOD services may involve a user selecting a particular video program at his/her user terminal for viewing through a user interface menu presented on a user terminal. When a user makes a selection for a VOD program, the streaming server relays the VOD program request to the system manager 20 for billing purposes. The system manager 20 commands the storage server 10 to retrieve the selected video program from the database 50 and to stream it to the appropriate one of the streaming servers 40(1)-40(N) that is responsible for streaming data to the user terminal that is the source of the VOD program request.

As shown in FIG. 1, an example of a user terminal is shown for user terminal 60(1), which comprises a set top box (STB) unit 62, a television or video monitor 64 and a remote control unit 66. A user interacts with his/her user terminal by way of controls on the remote control unit 66. FIG. 1 illustrates only a subset of the type of controls typically found on a remote control unit 66. In particular, there are rewind (REW) and fast forward (FF) buttons 67 and 68, respectively, on the remote control 66. The STB unit 62 receives commands from the remote control unit 66 and generates control signals that are transmitted to the appropriate streaming server, which in turn forwards those control signals to the system manager 20 or storage server 10. The REW and FF buttons 66 and 67 shown on the remote control unit 66 are example of buttons that trigger the performance of so-called "trick" functions in which data in the program data stream is manipulated to rewind (playback in reverse) or fast forward playback of the program data stream to the user terminal. In addition, the STB unit 62 may be configured to respond to multiple selections (pushes) of one of the buttons 66 and 67 within a certain time interval to increase the speed of rewind or fast forward, respectively, e.g., 2× for one push, 4× for two pushes, 8× for three pushes, 16× for four pushes, etc. The STB unit 62 responds to the user commands from the remote control and transmits appropriate requests to the streaming server (e.g., streaming server 40(1)), which in turn relays those requests to the storage server 10.

As indicated in FIG. 1, a technique is provided to reduce the latency associated with the delivery of data associated with the so-called trick functions requested by a user at a user terminal. Since the storage server 10 transmits program data to the streaming servers 40(1)-40(N) via the wide area network 30, there is an inherent delay associated with the streaming servers receiving the data and then retransmitting it to one or more of its associated user terminals. This delay becomes more apparent to the user when the user requests a trick function such as rewind or fast forward. The storage server 10 pre-builds trick data frames for a program when it "ingests" the program data from the database 50 for streaming to a user terminal that has requested the program.

According to the technique described herein, some of the data frames for the trick function are retrieved from the storage server 10 and some of the data frames are dynamically generated by the streaming server associated with the requesting user terminal. As an example, streaming server 40(1) would respond and process a trick function request from user terminal 60(1). The streaming server 40(1) forwards the request to the storage server 10 to fetch the pre-built trick data frames from the storage server 10. However, in the meantime, while waiting for those trick data frames from the storage server, the streaming server 40(1) dynamically generates trick data frames and streams them (as they are generated) to the requesting user terminal. Once the pre-built trick data frames arrive from the storage server 10, the streaming server 40(1) streams them to the user terminal. The user at the user terminal was able to experience the trick sooner than if all of the trick data frames originated at the storage server 10.

Figure 2:
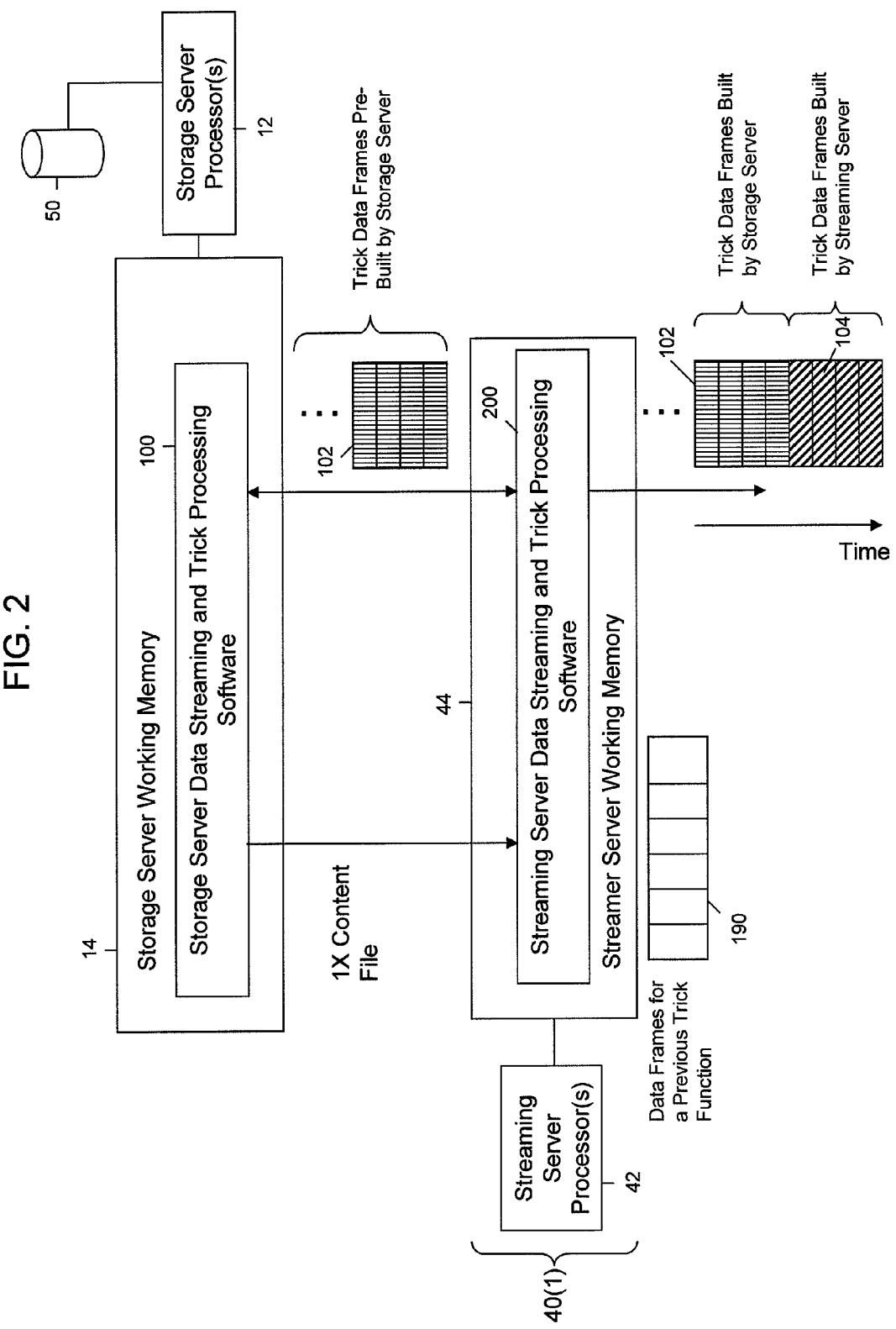
FIG. 2 is an example of a block diagram depicting interaction between a storage server and a streaming server of the data distribution network to perform the reduced latency trick streaming process.

Turning to FIG. 2, the interaction between the storage server 10 and a streaming server, e.g., streaming server 40(1), is described in more detail. The storage server 10 comprises one or more storage server processors (computers) shown at 12 and memory 14 that stores various software programs that the processor(s) 12 execute to perform the storage server functions. For example, there is storage server data streaming and trick processing software 100 in the memory 14. The processor(s) 12 execute the storage server data streaming and trick processing software 100 to continuously stream the normal speed (1×) program presentation data content (for normal 1× playback) and to stream trick data frames for a requested trick function to the streaming server 40(1). Again, it is noted that the storage server 10 pre-builds the trick data frames for a wide range of trick functions (rewind 2×, 4×, 8×, 16×, etc., and fast forward 2×, 4×, 8×, 16×) upon ingesting the program data for a program to be streamed to a user terminal.

The streaming server 40(1) comprises one or more streaming server processors (computers) shown at 42 and memory 44. The memory 44 stores the various software programs that the processor(s) 42 execute in order to perform the streaming server functions. For example, there is streaming server data streaming and trick processing software 200 in the memory 44. The processor(s) 42 execute the streaming server data streaming and trick processing software 200 to continuously buffer (store) the 1× data frames that are streamed to the streaming server 40(1) from the storage server 10 for streaming to a user terminal, and to build a trick data stream for streaming to a user terminal. In addition, the streaming server data streaming and trick processing software 200 maintains a buffer 190 of data frames for a previous trick function for use in building the trick data stream for the next trick function, if necessary.

It should be understood that there are other software programs in the storage server 10 and streaming server 40(1) that are not shown or described herein because they are not relevant to the reduced latency trick processing techniques described herein.

FIG. 2 further shows that when a trick function has been requested, the storage server data streaming and trick processing software 100 is reads the pre-built trick data frames shown at 102 for the requested trick function and transmit them to the streaming server 40(1). Similarly, the streaming server data streaming and trick processing software 200 is executed to generate trick data frames shown at 202 for the requested trick function. Thus, the storage server 10 and streaming server 40(1) share the burden of delivering the trick data frames, but cooperate in such a manner that the streaming server 40(1) generates enough of the initial trick data frames to account for the delay in receiving the pre-built trick data frames from the storage server 10. The term "first trick data frames" is used herein to refer to the pre-built trick data frames that are fetched from the storage server 10 and the term "second trick data frames" is used herein to refer to the trick data frames that the streaming server 40(1) dynamically generates. The streaming server 40(1) transmits the dynamically generated trick data downstream to the requesting user terminal as and when the data is ready and eventually the pre-built trick data frames will arrive from the storage server 10 and the streaming server 40(1) streams them to the user terminal.

Once the pre-built trick data frames arrive at the streaming server 40(1), it may no longer be necessary for the streaming server to generate trick data frames since the pre-built trick data frames will be used. However, if the user terminal sends a new command for a different trick (different speed or direction), the streaming server 40(1) may again dynamically generate some trick data frames to account for the delay in waiting for the pre-built trick data frames to arrive for the newly requested trick function.

The functions of the storage server 10 and streaming servers 40(1)-40(N) described herein may be performed by software, but in general may be implemented by any logic (programmable or fixed) encoded in one or more tangible media, e.g., embedded logic such as an application specific integrated circuit, digital signal processor instructions, etc.

Figure 3:
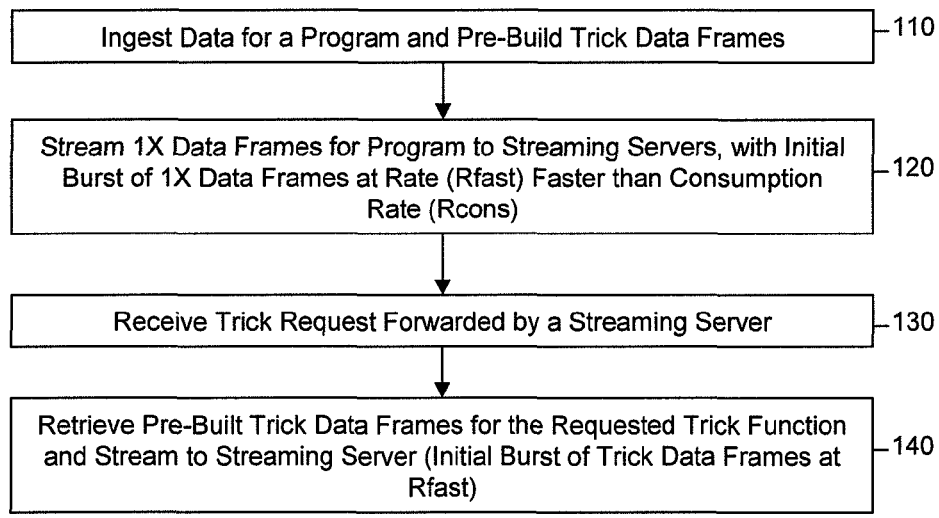
FIG. 3 is an example of a flow chart depicting operations at the storage server in performing the reduced latency trick streaming process.

Turning now to FIG. 3, the storage server data streaming and trick processing software 100 is further described by the illustrated flow chart depicting the associated operations or functions of the storage server 10. At 110, the storage server 10 ingests from the database 50 (FIG. 1) program data for a program to be streamed to a user terminal. At this time, the storage server 10 also pre-builds trick data for various tricks and trick speeds as described above. At 120, the storage server continuously streams to the streaming server the data stream for normal (1×) presentation of the program. For an initial time interval ("burst") of the program content, the storage server 10 transmits data to the streaming server at a rate Rfast that is faster than the rate Rcons at which the streaming server transmits the data stream to a user terminal. At 130, when a user at a user terminal requests a trick function, the storage server 10 receives the trick request forwarded to it by the streaming server associated with that user terminal. At 140, the storage server fetches the pre-built trick data frames (first trick data frames) for the requested trick function and streams those trick data frames to the streaming server. When streaming the trick data frames to the streaming server, the storage server transmits an initial burst of them (e.g., several seconds) at the faster rate Rfast, to prime the buffer at the streaming server. In general, whenever there is a speed switch in the presentation of the program at the user terminal (from pause to 1× play, 1× to 2×, etc.) the storage server 10 transmits an initial burst of the data frames to the streaming server at the faster rate to prime the buffer at the streaming server.

The storage server estimates how much data the streaming server can generate from the buffered (1× or slower speed) trick data that the streaming server has built up. Thus, the storage server chooses to start sending trick data files starting from that specific point onward (into the future) to ensure that there is no overlap or gaps in the trick data stream. At 140, the storage server terminates generation of the trick data frames in response to a control from the streaming server indicating that no further trick data frames are needed (because the user has stopped depressing the corresponding button on his/her remote control unit).

Figure 4:
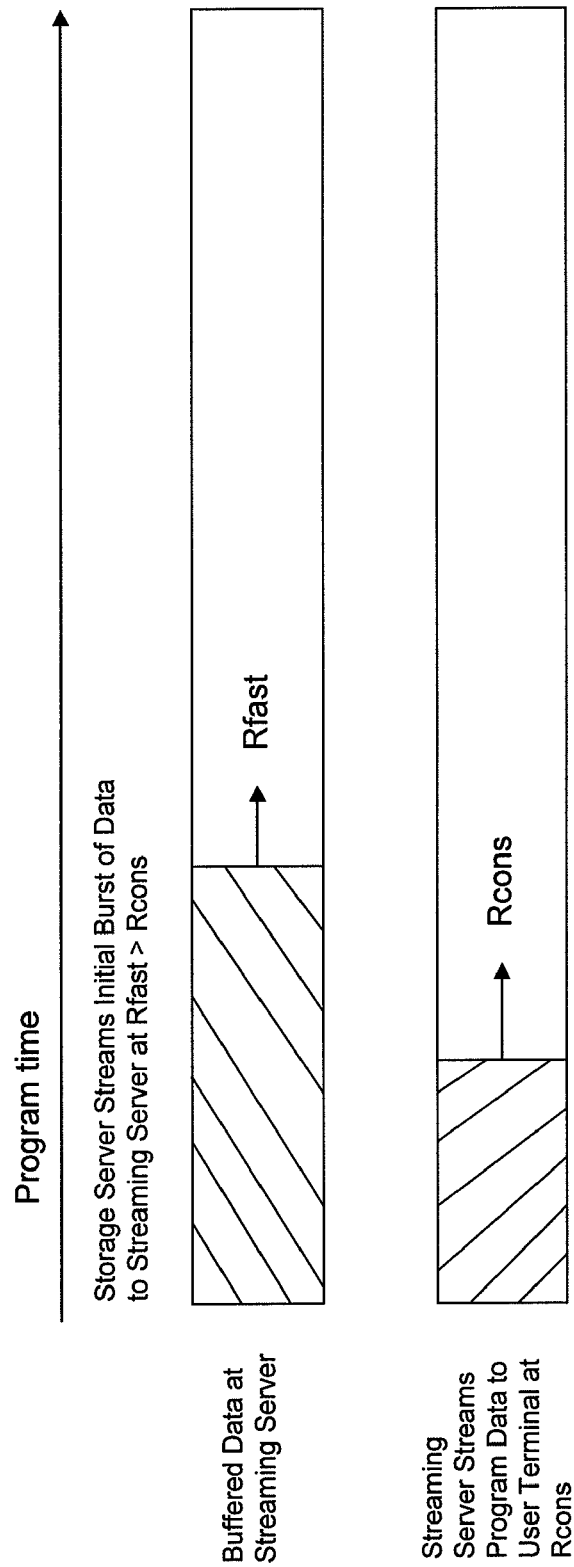
FIG. 4 is an example of a timing diagram depicting the buffering at the streaming server of data transmitted to it by the storage server.

FIG. 4 pictorially shows how the storage server 10 streams data to the streaming server at a rate, Rfast, that is faster than the consumption rate, Rcons, that the streaming server streams data to a user terminal, for an initial portion of the program. This occurs for an initial burst of data frames any time there is a change in speed, as explained above, so it occurs for normal 1× data frames as well as for trick data frames generated by the storage server that are streamed to the streaming server. Consequently, as shown in FIG. 4, at any point in time, the streaming server will have some buffered data (1×, 2×, etc.) in memory that is meant for future transmission and presentation (play-out) at the user terminal. That is, the streaming server will have in buffer/cache data frames for the program that are yet to be streamed to the user terminal for presentation. The streaming server uses this buffered future data to dynamically generate the next (faster) speed trick as explained in further detail hereinafter.

Figure 5:
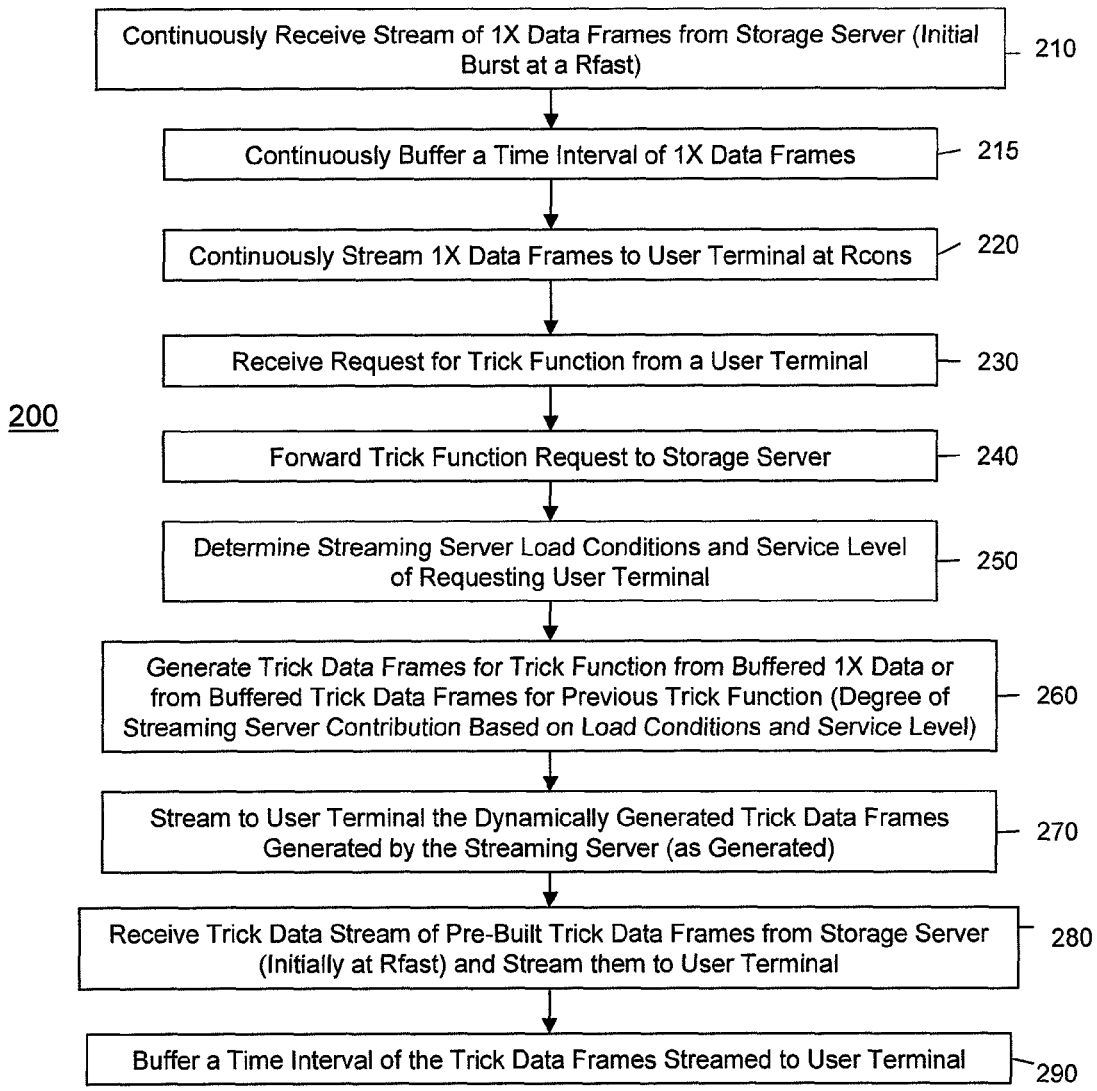
FIG. 5 is an example of a flow chart depicting operations at the streaming server in performing the reduced latency trick streaming process.

Referring now to FIG. 5, the streaming server data streaming and trick processing software 200 is further described by the illustrated flow chart depicting the associated operations or functions of the streaming server. At 210, the streaming server receives a stream of 1× data frames from the storage server, and for an initial period of time, it receives these data frames at the faster Rate, Rfast, as described above. At 215, the streaming server continuously buffers a certain time interval of the 1× data frames received from the storage server. At 220, the streaming server streams the 1× data frames for the program to the user terminal at the rate, Rcons. At 230, the streaming server receives a request for a trick function from a use terminal and at 240, the streaming server forwards that trick request to the storage server at 240. The storage server responds to the trick request as described above in connection with FIG. 3.

At 250, the streaming server may determine its computational and related load conditions and also the service level of the user terminal that has requested the trick. The functions at 250 are optional, but have certain benefits. For example, the streaming server may be configured not to locally compute trick data frames when it is already currently under heavy load conditions. Alternatively, the streaming server may locally generate a portion of the needed trick data frames according to its current load conditions: generates zero or small portion of the trick data frames when under heavy load conditions and generates a greater portion of the trick data frames when under lighter load conditions.

In addition, the streaming server may control the amount of its contribution to the trick data file streaming process (and thus latency to the user) based on a level of service to which the user terminal has subscribed. For example, the system may be configured such that a user may need to pay for a higher ("premium") level of service in order to benefit from the reduced latency delivery of tricks by participation of the streaming server. Thus, at 250, the streaming server determines its level of participation in the generation of the trick data frames also based on the service level of the requesting user terminal. If the requesting user terminal is not subscribed to the necessary service level, the streaming server may be configured to completely not participate or only minimally participate in the generation of the trick data stream.

Depending on streaming server load conditions and whether the user terminal is eligible for the reduced latency trick service features (according to the user terminal's service level), then at 260, the streaming server generates trick data frames from the buffered 1× or from the buffered trick data frames for a previous trick function. Since the streaming server has buffered data frames for future presentation at the user terminal, for a fast forward trick the streaming server can select to generate the trick data frames associated with the most future portion of the trick request and use the pre-built trick data frames that will eventually arrive from the storage server for the later portions of the trick request. Conversely, for a rewind trick, the streaming server may select to generate the trick data frames for the most recent portion of the trick (since it may not have in its buffer data frames for older portions of the program) and allow the storage server to supply the pre-built trick data frames for the older portion of the trick. In either case, the streaming server may be configured to generate just enough of the trick data frames to cover any latency incurred when fetching (waiting for the) pre-built trick data frames from the storage server 10 and streamed to the streaming server.

At 270, the streaming server streams to the user terminal the dynamically generated trick data frames that the streaming server generates as those trick data frames are generated). At 280, the streaming server receives the pre-built trick data frames from the storage server (an initial burst of which transmitted at the faster rate Rfast) and streams them to the user terminal. At 290, the streaming server buffers a certain time interval of the trick data frames for use in dynamically generate data frames for subsequently requested trick functions from the user terminal.

Figure 6:
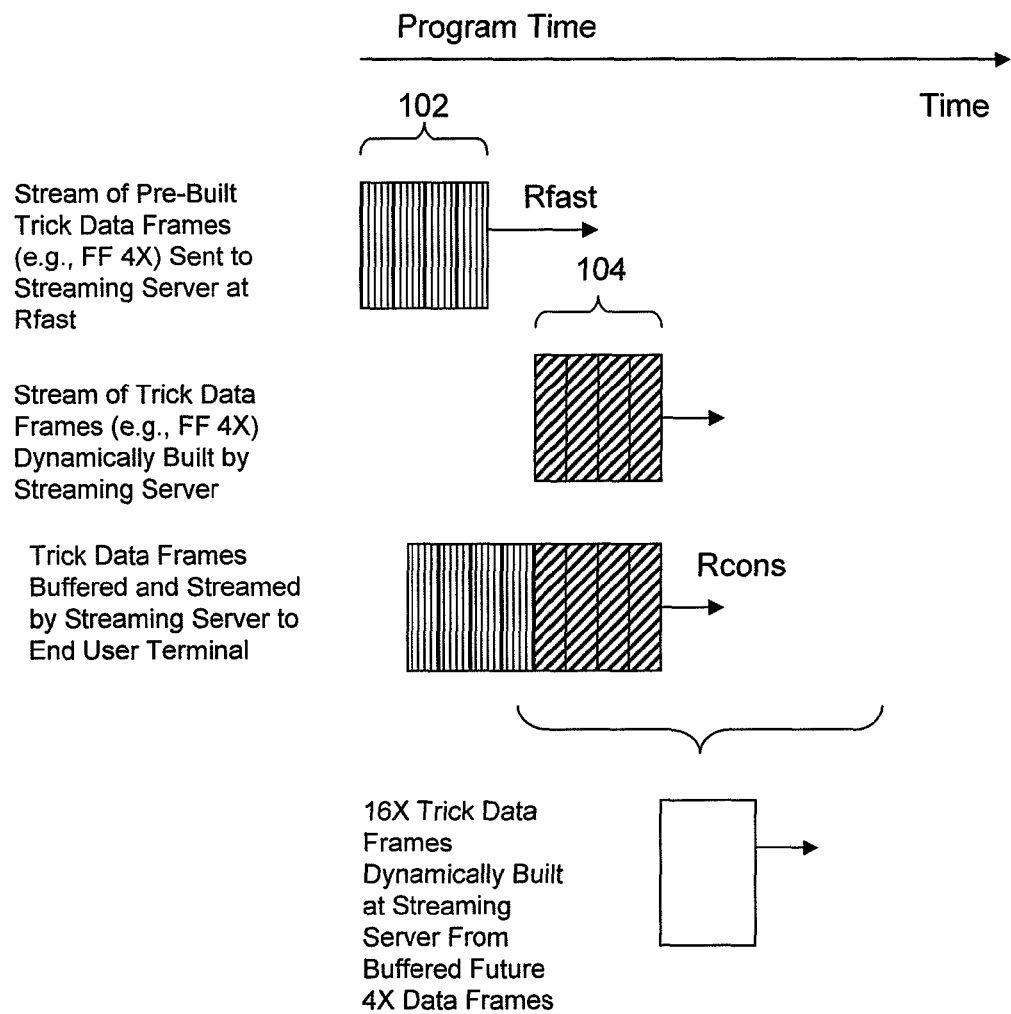
FIG. 6 is an example of a timing diagram depicting the generation of a trick data stream from trick data frames generated by the storage server and trick data frames generated by the streaming server.

Turning now to FIG. 6, a further example of the reduced latency trick processing technique is described with respect to an example in which a requested trick is 4× fast forward trick. In general, if the tricks are 1×, 4×, 16× and 64× (fast forward or rewind), a portion of the 4× trick may be generated from the 1× data frames, the data frames for a 16× trick created from the data frames for the 4× trick, the data frames for the 64× generated from the data frames for the 16× trick and so on. The advantage is that the amount of latency coverage is increased from the amount of the current trick buffered at the streaming server.

For example, as shown in FIG. 6, when a 4× fast forward trick is requested, the storage server 10 retrieves pre-built first trick data frames 102 and sends an initial burst of those data frames to the streaming server at the faster rate Rfast, and after that initial burst the pre-built first trick data frames 102 are sent at the normal rate Rcons. In the meantime, the streaming server dynamically generates trick data frames 104 and streams them to the user terminal as they are generated. The streaming server also buffers a certain time interval of the trick data frames (e.g., several seconds) to cover any network latency/jitter. If the next requested trick is a 16× fast forward (e.g., a 4× multiplier to get to the next trick speed), then a two second buffer of the 4× trick data frames can be used to produce 0.5 second of the a 16× trick. Thus, in the example shown in FIG. 6, the streaming server uses the buffered "future" data frames from the 4× trick to produce the data frames for the 16× trick. If the speed jump to the next trick is a factor of 8, then a two second buffer would only produce 0.25 second of latency coverage. By increasing the amount of local storage at the streaming server (generally achieved over time by bursting at an increased fill rate from the storage server to the streaming server), the streaming server can cover a larger latency "hole" with temporary dynamic trick fill-in.

Fast forward and rewind tricks may be generally created by pulling out so-called MPEG encoded intra-coded ("I") frames from the original data stream. However, another technique to create the tricks is to pull I-frames out from the previous trick, with dummy synthesized "repeat" frames inserted between them, if necessary.

As long as the streaming server knows the rules that the storage server uses in creating the program clock reference (PCR) and presentation time stamps (PTS) etc., in the trick data frames, the streaming server can produce a reasonable clone of a portion of the trick data frames. The trick data frames produced by the streaming server need not have exactly the same I-frames (since only a portion of them may be in the current trick anyhow). The streaming server can still produce a portion of the trick data frames to be mated with the pre-built trick data frames from the storage server when they arrive. This may be important because some STBs will show artifacts if there is a time-based discontinuity in the stream (i.e., the PCRs do not match up).

In general, the streaming server may buffer multiple types of data segments in local cache (1×, +/−8×, etc.). The streaming server may be configured to stream tricks in a particular format independent of whether or not tricks in that format are locally cached. Ingest of the storage server computed tricks may occur concurrent with the streaming server's local computation of tricks from other cached formats.

Although the apparatus, system, and method for reduced latency trick processing are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for reduced latency trick processing, as set forth in the following claims.

What is claimed is:

1. A method comprising:
   in response to a request for a trick function associated with program data being streamed to a user terminal, retrieving pre-built first trick data frames for the trick function from a first computing apparatus where the pre-built first trick data frames are stored;
   generating second trick data frames for an initial portion of the trick function at a second computing apparatus while the pre-built first trick data frames are being received from the first computing apparatus such that sufficient trick data frames are generated to account for a delay in receiving the pre-built first trick data frames;
   streaming the second trick data frames to the user terminal as the second trick data frames are generated;
   receiving at the second computing apparatus the pre-built first trick data frames from the first computing apparatus; and
   streaming the pre-built first trick data frames to the user terminal for a remaining portion of the trick function such that there is no overlap or gap in data frames associated with the second trick data frames streamed to the user terminal and data frames associated with the pre-built first trick data frames.

2. The method of claim 1, and further comprising:
   at the first computing apparatus, transmitting data to the second computing apparatus for an initial period of time at a rate that is faster than a rate at which the second computing apparatus transmits data to the user terminal; and
   at the second computing apparatus, buffering the transmitted data received from the first computing apparatus to store data frames of the program data that are yet to be streamed to the user terminal for future transmission to and presentation at the user terminal.

3. The method of claim 2, wherein at the first computing apparatus, said transmitting comprises:
   transmitting normal speed presentation data for an initial period of time at the rate that is faster than the rate at which the second computing apparatus transmits data to the user terminal; and
   transmitting the pre-built first trick data frames for an initial period of time at the rate that is faster than the rate at which the second computing apparatus transmits data to the user terminal.

4. The method of claim 2, and further comprising, at the second computing apparatus, buffering data frames generated for a previously requested trick function, wherein said generating at the second computing apparatus comprises generating the second trick data frames for a next requested trick function using buffered data frames for the previously requested trick function.

5. The method of claim 1, and further comprising, at the second computing apparatus, determining load conditions of the second computing apparatus, and wherein generating the second trick data frames is dependent on load conditions of the second computing apparatus.

6. The method of claim 5, wherein generating the second trick data frames comprises generating second trick data frames for a portion of the trick function whose amount depends on load conditions such that when the second computing apparatus is experiencing heavy load conditions, second trick data frames are generated for zero or a small portion of the trick function and when the second computing apparatus is experiencing relatively light load conditions, second trick data frames are generated for a greater portion of the trick data frames.

7. The method of claim 1, and further comprising, at the second computing apparatus, determining a service level associated with the user terminal that has requested the trick function, and wherein said generating depends on the service level of the user terminal.

8. The method of claim 1, wherein the program data is video program data, and wherein the trick function is a fast forward or rewind function.

9. The method of claim 1, wherein generating the second trick data frames at the second computing apparatus comprises generating an amount of second trick data frames to cover any latency incurred in receiving the first trick data frames transmitted from the first computing apparatus over a wide area network.

10. The method of claim 1, wherein generating comprises generating, for a fast forward trick function, second trick data frames associated with the initial portion of the fast forward trick function and using the pre-built first trick data frames received from the first computing apparatus for later portions of the fast forward trick function.

11. The method of claim 1, wherein generating comprises generating, for a rewind trick function, second trick data frames associated with a most recent portion of the rewind trick function and using the pre-built first trick data frames received from the first computing apparatus for older portions of the rewind trick function.

12. A system comprising:
a storage server that is configured to transmit program data to be streamed to a user terminal; and
a streaming server coupled to the storage server over a wide area network, wherein the streaming server is configured to receive the program data from the storage server via the wide area network and to transmit the program data in a data stream to the user terminal, wherein the streaming server is further configured to:
respond to a request for a trick function associated with program data being streamed to the user terminal to send a fetch request to the storage server for pre-built first trick data frames for the trick function stored at the storage server;
generate second trick data frames for an initial portion of the trick function while the pre-built first trick data frames are being retrieved from the storage server such that sufficient trick data frames are generated to account for a delay in receiving the pre-built first trick data frames;
stream the second trick data frames to the user terminal as the second trick data frames are generated;
receive the pre-built first trick data frames from the storage server; and
stream the pre-built first trick data frames to the user terminal for a remaining portion of the trick function such that there is no overlap or gap in data frames associated with the second trick data frames streamed to the user terminal and data frames associated with the pre-built first trick data frames.

13. The system of claim 12, wherein the storage server is configured to transmit data to the streaming server for an initial time period at a rate that is faster than a rate at which the streaming server transmits data to the user terminal, and wherein the streaming server is configured to buffer the transmitted data received from the storage server to thereby store data frames of the program data that are yet to be streamed to the user terminal for future transmission to and presentation at the user terminal.

14. The system of claim 13, wherein the storage server is configured to transmit normal speed presentation data for an initial period of time at the rate that is faster than the rate at which the streaming server transmits data to the user terminal, and to transmit the pre-built first trick data frames for an initial period of time at the rate that is faster than the rate at which the streaming server transmits data to the user terminal.

15. The system of claim 13, wherein the streaming server is further configured to buffer trick data frames generated for a previously requested trick function, and to generate second trick data frames for a next requested trick function using the buffered data frames for the previously requested trick function.

16. The system of claim 12, wherein the streaming server is further configured to determine its load conditions and to generate the second trick data frames depending on its load conditions at the time of the trick function request.

17. The system of claim 16, wherein the streaming server is configured to generate second trick data frames for a portion of the trick function depending on load conditions such that when the streaming server is experiencing heavy load conditions, the streaming server generates second trick data frames for zero or a small portion of the trick function and when the streaming server is experiencing relatively light load conditions, the streaming server generates second trick data frames for a greater portion of the trick data frames.

18. The system of claim 12, wherein the streaming server is further configured to determine a service level associated with the user terminal that requested the trick function and to generate the second trick data frames depending on the service level of the user terminal.

19. The system of claim 12, wherein the streaming server is further configured to generate an amount of the second trick data frames to cover any latency incurred in receiving the first trick data frames from the storage server.

20. One or more non-transitory tangible media encoded with logic for execution and when executed operable to:
buffer program data received from a storage server at a first rate during an initial period of time associated with streaming of the program data;
stream the program data to a user terminal at a second rate, wherein the second rate is slower than the first rate;
request pre-built first trick data frames from the storage server, wherein the pre-built first trick data frames are for a trick function requested by the user terminal;
generate second trick data frames for an initial portion of the trick function while the pre-built first trick data frames are being received from the storage server such that sufficient trick data frames are generated to account for a delay in receiving the pre-built first trick data frames;
stream the second trick data frames to the user terminal as they are generated;
receive the pre-built first trick data frames from the storage server; and
stream the pre-built first trick data frames to the user terminal for a remaining portion of the trick function such that there is no overlap or gap in data frames associated with the second trick data frames streamed to the user terminal and data frames associated with the pre-built first trick data frames.

21. The one or more tangible media of claim 20, and further comprising logic that when executed buffers trick data frames for a previously requested trick function, and wherein the logic that generates the second trick data frames is configured to generate the second trick data frames for a next requested trick function using the buffered data frames for the previously requested trick function.

22. The one or more tangible media of claim 20, wherein the logic that buffers is configured to buffer the first trick data frames received from the storage server for an initial period of time at the first rate.

23. The one or more tangible media of claim 20, and further comprising logic that when executed determines load conditions of a computing apparatus that generates the second trick data frames, and wherein the logic that generates the second trick data frames is dependent on the load conditions.

24. The one or more tangible media of claim 20, and further comprising logic that when executed determines a service level associated with the user terminal that has requested the trick function, and wherein the logic that generates the second trick data frames is dependent on the service level of the user terminal.

25. The one or more tangible media of claim 20, wherein the logic that generates the second trick data frames comprises logic that generates an amount of second trick data frames to cover any latency incurred in receiving the first trick data frames from the storage server.

26. A method comprising:
 receiving and buffering program data received from a storage server at a first rate during an initial period of time associated with streaming of the program data;
 streaming the program data to a user terminal at a second rate, wherein the second rate is slower than the first rate;
 requesting pre-built first trick data frames from the storage server, wherein the pre-built first trick data frames are for a trick function requested by the user terminal;
 generating second trick data frames for an initial portion of the trick function while the pre-built first trick data frames are being received from the storage server such that sufficient trick data frames are generated to account for a delay in receiving the pre-built first trick data frame;
 streaming the second trick data frames to the user terminal as the second trick data frames are generated;
 receiving the pre-built first trick data frames; and
 streaming the pre-built first trick data frames to the user terminal for a remaining portion of the trick function such that there is no overlap or gap in data frames associated with the second trick data frames streamed to the user terminal and data frames associated with the pre-built first trick data frames.

27. The method of claim 26, wherein generating the second trick data frames comprises generating an amount of second trick data frames to cover any latency incurred in receiving the first trick data frames from the storage server.

28. The method of claim 26, and further comprising transmitting the pre-built first trick data frames from the storage server for an initial period of time at the first rate.

\* \* \* \* \*